United States Patent [19]
Snyder

[11] 3,809,026
[45] May 7, 1974

[54] ROTARY VANE INTERNAL COMBUSTION ENGINE

[76] Inventor: Duane P. Snyder, Rt. 1, Box 133, Bridgman, Mich. 49106

[22] Filed: Feb. 28, 1973

[21] Appl. No.: 336,446

[52] U.S. Cl. ............... 123/8.47, 418/104, 418/196
[51] Int. Cl. ........................................... F02b 53/00
[58] Field of Search .......... 123/8.45, 8.47; 418/196, 418/91, 94, 104

[56] References Cited
UNITED STATES PATENTS

| | | | |
|---|---|---|---|
| 3,297,006 | 1/1967 | Marshall | 418/94 X |
| 1,349,882 | 8/1920 | Homan | 123/8.47 |
| 2,097,881 | 11/1937 | Hopkins | 418/196 X |
| 3,439,654 | 4/1969 | Campbell | 123/8.47 X |
| 2,005,141 | 6/1935 | Gutzwiller | 418/94 X |

FOREIGN PATENTS OR APPLICATIONS

| | | | |
|---|---|---|---|
| 1,128,173 | 8/1956 | France | 123/8.47 |
| 938,224 | 1/1956 | Germany | 123/8.47 |

Primary Examiner—Carlton R. Croyle
Assistant Examiner—Michael Koczo, Jr.
Attorney, Agent, or Firm—Oltsch & Knoblock

[57] ABSTRACT

An engine of the internal combustion type having a plurality of cooperating elliptical rotors. A set of four such rotors rotate in the same direction about parallel axes to form a combustion chamber having a varying volume which depends upon the rotational position of the rotors. One of the rotors of each set of four rotors is slotted at its side wall so as to provide valving for the combustion chamber.

10 Claims, 9 Drawing Figures

PATENTED MAY 7 1974 3,809,026

ROTARY VANE INTERNAL COMBUSTION ENGINE

SUMMARY OF THE INVENTION

This invention relates to an internal combustion engine and has specific application to a rotary engine.

The rotary engine of this invention includes a plurality of rotors rotatable within a housing about parallel axes. Each of the rotors is of an elliptical cross sectional configuration and cooperates with three other such rotors to define a combustion chamber of varying volume depending upon the rotational position of the rotors. The power deriving combustion process takes place in each such combustion chamber with the air intake into the chamber and the exhaust therefrom passing through slotted opening means in the side wall of one of the rotors. The rotors in all rotative positions are spaced from the side wall of the engine housing so as to permit circulation of air along the inner face of the housing for rotor cooling purposes and for accomplishing afterburning of the exhaust from the combustion chambers. Each of the rotors of the engine is designed so as to accommodate coolant water for the purpose of cooling the engine.

Accordingly, it is an object of this invention to provide a rotary internal combustion engine having a unique valving means for the intake of combustion air and the exhaust of combustion gases.

Another object of this invention is to provide a rotary internal combustion engine having an after-burning effect in which the exhaust gases are burned to complete combustion of the engine fuel.

Another object of this invention is to provide a rotary internal combustion engine which provides for maximum burning of the fuel so as to provide an ecologically clean engine.

Another object of this invention is to provide a rotary engine having a unique sealing means between rotors.

Still another object of this invention is to provide an internal combustion engine of the rotary type having means for cooling the rotors thereof.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

Figure 1:
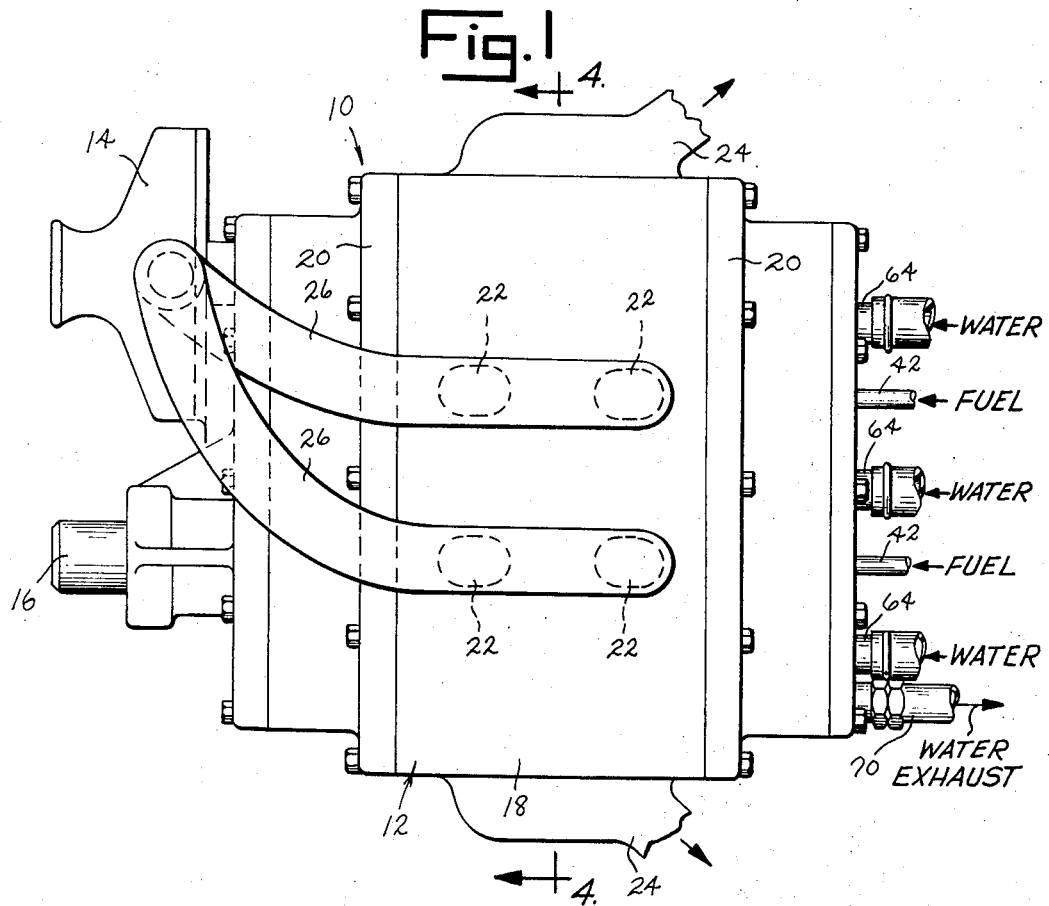
FIG. 1 is a view of the outer housing of the engine.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The rotary engine depicted in the drawings is designated by the reference numeral 10 and includes housing 12 to which may be attached a blower 14 and from which may project a drive shaft 16. Engine housing 12 includes a side wall part 18 and a pair of opposed end wall parts 20. Side wall part 18 is of a four-sided enclosed configuration having opposed air inlet ports 22 and opposed exhaust gas outlet ports 24 formed therein. Each air inlet port 22 is connected by a conduit 26 to blower 14. Each exhaust gas outlet port 24 is vented into the atmosphere.

A plurality of rotors 28 are journaled within housing 12. Rotors 28 extend between end wall parts 20 of the housing and are rotatable about parallel axes. Each rotor includes reduced end portions 30 which are journaled by suitable bearings 31 seated in end wall parts 20 and has an elliptical cross sectional outer configuration. Rotors 28 are grouped into operable sets of four with each such set sharing at least two rotors with another set. Each set of four vanes cooperates to define a combustion chamber 32. While in the illustrated embodiment two combustion chambers 32 are shown, it is to be understood that the number of sets of rotors and the number of combustion chambers defined by the sets can vary from one to several.

One rotor 28a of each set of four rotors has a plurality of slots 34 formed in its side 35. Each rotor 28a is located at one corner of housing 12 and is positioned between an air inlet port 22 and exhaust gas outlet port 24. As best observed in FIGS. 4–7, rotors 28 are spaced from the inner face 36 of housing side wall part 18 in all rotative positions of the rotors so as to permit, for reasons later to be explained, air as indicated by arrows 38 to enter from inlet ports 22 and pass around inner face 36 of the housing to outlet ports 24. Located within one of the end wall parts 20 of housing 12 and centered geometrically relative to each combustion chamber 32 is a fuel injection port 40. Each fuel injection port 40 is connected by a suitable conduit 42 to a fuel metering and pumping system (not shown). To provide an operable, efficient engine, there should be no air gap, except at slots 34, between sides of adjacent rotors. This may be accomplished by designing the rotors to make slight sliding contact, or, preferably, by utilizing seals 44 which are positioned at all times between the sides 35 of the rotors and which slide across the outer surfaces of the rotors during rotor rotation. Each seal 44 extends the full length of the elliptical portion of the rotor between end portions 30.

Each rotor 28 has a gear 46 secured coaxially to one of its end portions 30. Gears 46 are secured to common end portions 30 and are positioned outwardly of the adjacent housing end wall part 20. A larger gear 48 is located between and intermeshes with each of the four gears 46 of each set of rotors. Since there are two sets of vanes, there will be two gears 48. One such gear 48 serves as an idler, and the other gear 48 is connected to drive shaft 16. Thus, rotation of rotors 28 causes the rotation of gears 48 and the resulting rotation of drive shaft 16. Blower 14 can be suitably geared to one of the gears 46. It is to be understood that the aforedescribed method of gearing rotors 28 to drive shaft 16 and blower 14 heretofore described is well within the skill of the art and can vary from engine to engine.

Figure 4:
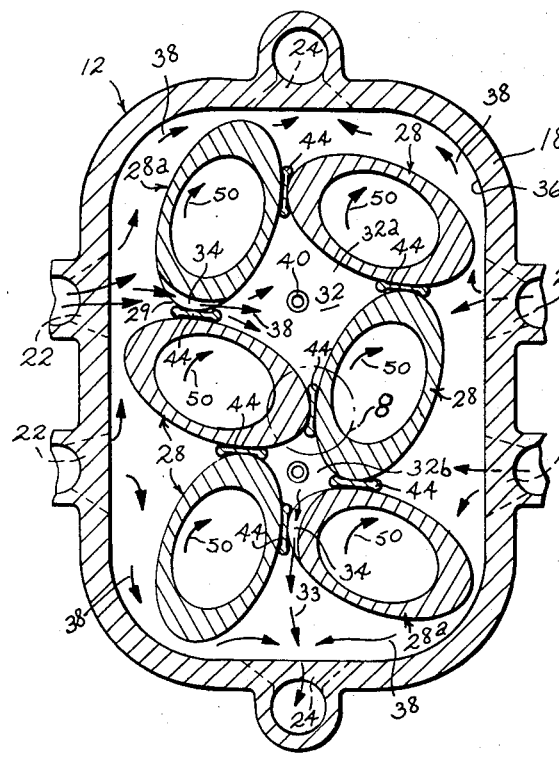
FIG. 4 is a cross sectional view taken along line 4—4 of FIG. 1 showing the rotors thereof in one operative position.
Figure 5:
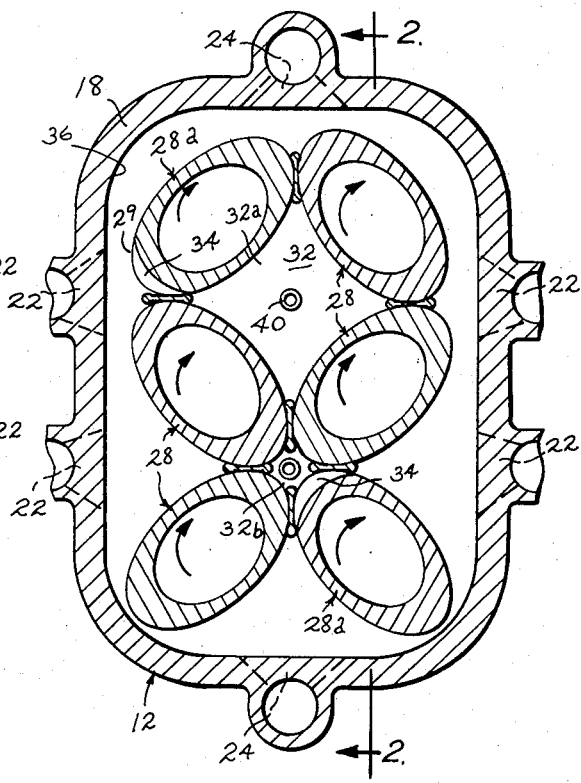
FIGS. 5–7 are cross sectional views of the rotary engine showing the rotor thereof in sequential operating positions.

The combustion cycle of engine 10 will now be described. Reference will be directed to FIGS. 4–7 and the upper combustion chamber 32a in the drawings. At all times during operation of the engine air indicated by arrows 38 enters housing 12 through ports 22 and the rotors 28 rotate in the direction of arrows 50. Air 38 may be of a compressed nature issuing from blower 14, or in those adaptations of engine 10 wherein a blower is not used, the air may be drawn into housing 10 by means of a vacuum device or venturi action. Portions of air 38 pass at all times along inner face 36 of housing side wall part 18, around rotors 28, and out outlet ports 24. During the cycle intake sequence of upper combustion chamber 32a, as shown in FIG. 4, rotor 28a is positioned with its slotted tip 29 directed toward the lower adjacent rotor 28 so that the slots 34 form inlets into chamber 32a through which air 38 from inlet ports 22 enters the chamber which is in an expanded state and of reduced pressure therein. As rotors 28 continue to rotate the slotted tip 29 of rotor 28a moves away from the lower rotor, as shown in FIG. 5, to shut off the flow of air into chamber 32a and to begin the compression sequence for the combustion cycle. At the beginning of the compression sequence, fuel enters combustion chamber 32a through fuel injection port 40. If desired, fuel could enter the chamber during the latter part of the intake sequence.

Figure 6:
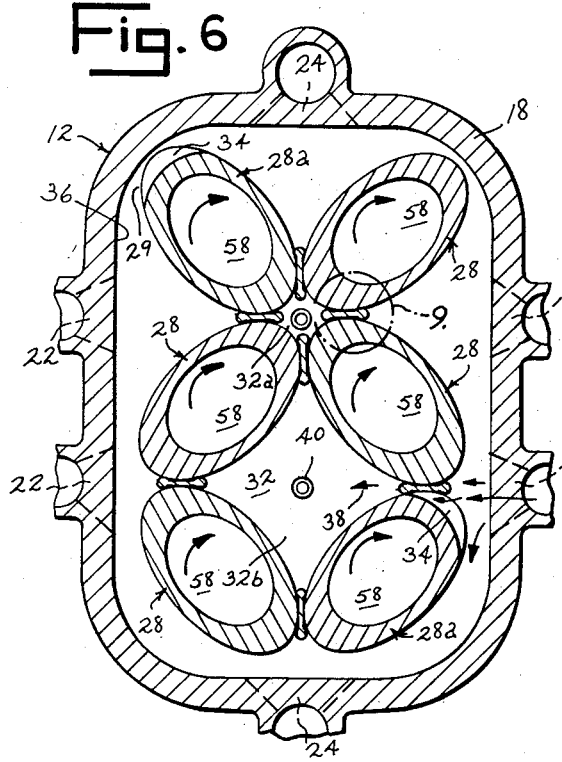

In FIG. 6, continued rotation of rotors 28 causes combustion chamber 32a to be reduced to a minimum volume where ignition of the air and fuel mixture within the chamber takes place. Ignition of the fuel mixture causes an expansion of the combustion gases and a volumetric increase in chamber 32a and the resulting rotation of rotors 28 into the position illustrated in FIG. 7 where the slotted tip 29 of rotor 28a is directed toward the adjacent right rotor so that slots 34 therein form outlets in the chamber in general alignment with an outlet port 24. The combustion gases within expanded chamber 32a flow outwardly through slots 34 as shown by arrow 33 due to the pressure differential between the gas within chamber 32a and the air 38 at outlet port 24. As the exhaust gases 33 pass through slots 34 and mix with air 38 at outlet port 24, further combustion or afterburning of the exhaust gases takes place. Continued rotation of rotors 28 causes a reduction in volume of combustion chamber 32a, thereby assuring that substantially all of the exhaust gases are expelled from the combustion chamber. Slotted tip 29 of rotor 28a rotates into the position illustrated in FIG. 4 so as to permit inlet air 38 to again enter combustion chamber 32a for the purpose of beginning another combustion cycle.

Figure 7:
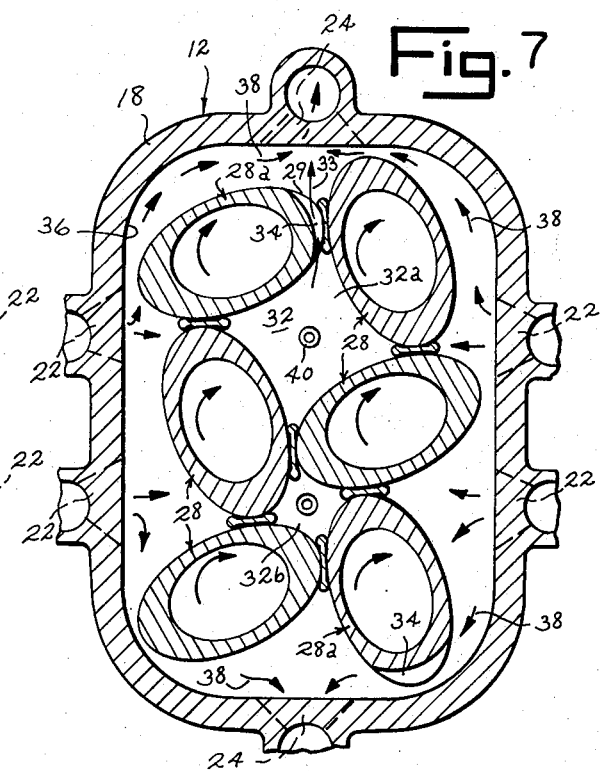

The combustion cycle occurring with regard to the lower combustion chamber 32b in FIGS. 4–7 while of the same sequence is out of phase with the combustion cycle of chamber 32a. In FIG. 6, air 38 has just entered chamber 32b through slots 34 in rotor 28a of the lower set of four rotors at the finish of the intake sequence with the compression sequence in chamber 32b just beginning. The fuel is preferably injected into chamber 32b through port 40 at this time. In FIG. 7 the ignition of the air and fuel mixture in chamber 32b is occurring. In FIG. 4 ignition has occurred and the expansion sequence with power delivery to the lower set of rotors 28 has taken place, followed by the exhaust sequence in which gases 33 pass through slots 34 in rotor 28a and mix with air 38 to be afterburned at the lower outlet port 24. In FIG. 5, the exhaust sequence in chamber 28b is completed and rotor 28a of the chamber is about to be rotated into the position shown in FIG. 6 to begin again the intake sequence of the cycle.

Figure 8:
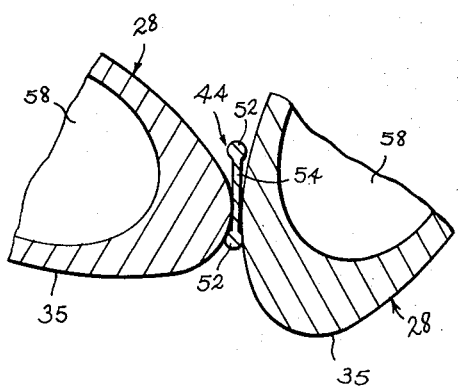
FIG. 8 is an enlarged fragmentary view taken of that portion of FIG. 4 shown within broken circular line 8.
Figure 9:
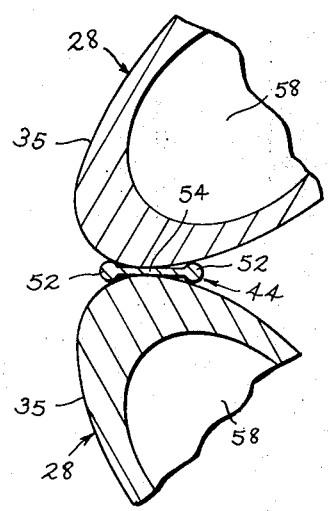
FIG. 9 is an enlarged fragmentary view of that portion of FIG. 6 shown within broken circular line 9.
Figure 2:
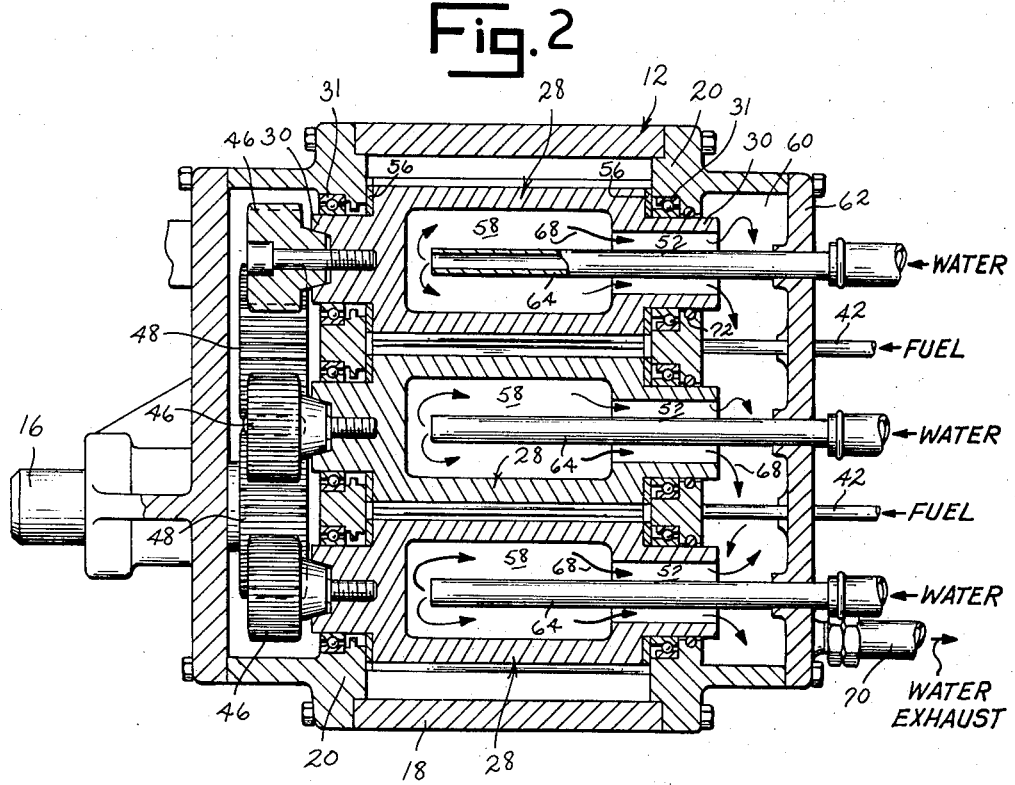
FIG. 2 is a sectional view of the engine showing the internal components thereof.
Figure 3:
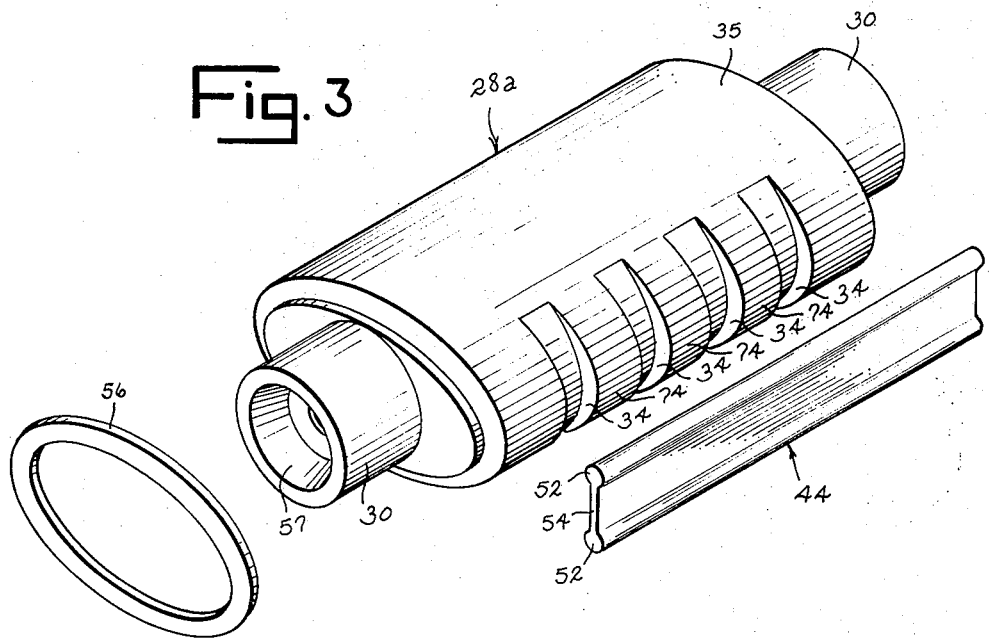
FIG. 3 is a perspective detailed view of one of the rotors of the engine and the seals associated with the rotor.

The sealing effect of seals 44 located between rotors 28 will now be described. Each seal 44 includes rounded end portions 52 connected by a web 54 of substantially uniform thickness. The thickness of web 54 is slightly less than the spacing between sides 35 of adjacent rotors 28. This spacing between adjacent rotors 28 is substantially constant at all rotational positions of the rotors. The maximum thickness of ends 52 of each seal 44 exceeds the spacing between adjacent rotors so as to prevent the seal from slipping from between the rotors. The width of web 54 as measured between ends 52 is such that with adjacent rotors being positioned in a general tip to tip relationship each end 52 of the seal will make contact with the sides 35 of both rotors, as illustrated in FIG. 9, thereby reducing lateral play of the seal and effecting a seal between the rotors. When the tip of one rotor 28 is positioned further around side 35 of the adjacent rotor 28, such as shown in FIG. 8, the width of web 54 permits the seal to shift slightly laterally until one end 52 of the seal is pressed into contact with the sides of the adjacent rotors, thereby effecting a sealing relationship between the rotors. This slight lateral shifting of the seal is accomplished by the differential between the pressure in combustion chambers 32 or the inside of the rotors 28 and the pressure outside of the rotors. Thus, during the exhaust sequence of the combustion cycle only the outermost seal end 52 or the end most closely adjacent the wall part 18 of the housing will contact the sides of the rotors, while during the compression sequence of the cycle only the innermost end 52 of the seal, that is the end located within a combustion chamber 32, will contact the sides of the rotors. Seals 44 can be constructed of a carbon, high temperature plastic, or other high temperature material. To enhance the sealing of rotors 28, an end seal 56 may be positioned between each rotor and the inner faces of housing end wall parts 20.

Each rotor 28 preferably has a center cavity 58 formed therein. An opening 57 into the center cavity 58 of each rotor is formed in one of the reduced end portions 30 of the rotor. A plenum 60 is formed between one of the end wall parts 20 of housing 12 and a cap 62. The openings 57 of rotors 28 extend into plenum 60. A conduit 64 extends in a sealed relationship through cap 62, with clearance through a rotor opening 57, and into central cavity 58 of each rotor. Each conduit 64 is connected to a pressurized water source which forces coolant water into the center cavity 58 of the rotor, causing the cooling thereof during operation of the engine. The coolant water flows through openings 57 of the rotors, as indicated by arrows 68, into plenum 60 and there out one or more water outlets or exhausts 70 to be recirculated by any suitable plumbing means (not shown) through a heat exchanger and back into the rotor cavities 58. Suitable O-rings 72 or similar seals may be provided between the open end portions 30 of the rotors and end wall part 20 of the housing.

It is to be understood that while engine 10 has been described as having a diesel or compressive means of initiating combustion within combustion chambers 32, a spark plug type ignition system could be utilized to initiate combustion of the fuel-air mixture at the end of the cycle compression sequence of each combustion chamber 32. Slots 34, in rotors 28a serve in cooperation with adjacent unslotted rotors 28 as valve means permitting intake of the inlet air into the combustion chamber and provide for the exhaust of the combustion gases. Slots 34, instead of one elongated opening, are preferably formed in the sides of rotors 28a so as to provide intervening side wall parts 74 to support the seal 44. The afterburning of the combustion gases within housing 12 through the utilization of a continuing supply of inlet air passing around the rotors on the inside of the housing and out through selected outlet ports provides a cleaner burning engine.

It is to be understood that the invention is not to be limited to the details above given but may be modified within the scope of the following appended claims.

What I claim is:

1. A rotary engine of the internal combustion type comprising a housing having a cavity therein, at least four rotors of similar substantially elliptical cross sectional shape journaled to rotate within said cavity about parallel axes, power transmitting means coupling said rotors for simultaneous rotation of the rotors in one direction, said rotors spanning said cavity and each having its side in continual sealing relationship with the sides of two other rotors in all rotative positions of the rotors, the sides of said rotors defining a combustion chamber between rotors, said chamber varying in volume depending upon the rotational position of the rotors and having a maximum volume at a first rotor position and a minimum volume at a second rotor position, said housing including an inlet port and an outlet port spaced from said inlet port, one of said rotors having a slot means formed in its side, said inlet and outlet ports located adjacent said one rotor, said slot means forming in conjunction with the side of another of said rotors an air intake passage into said chamber when said rotors are located generally in their said first position, said slot means forming in conjuction with the side wall of still another of said rotors a combustion gas exhaust passage from said chamber when said rotors are located generally in their said second position, seal means disposed between adjacent rotors at the sides thereof, said seal means fitting slidably between said adjacent rotors and being positioned at all times during rotor rotation between points of closest contact of the sides of said adjacent rotors, and means for introducing fuel into said chamber.

2. The rotary engine of claim 1 wherein said inlet port is aligned with said intake passage and said outlet port is aligned with said exhaust passage.

3. The rotary engine of claim 2 wherein said cavity is defined by a housing inner face, said inner face being spaced from the sides of said rotors in all rotative positions of the rotors, said rotor sides and housing inner face defining continually open air passage means from said inlet port to said outlet port.

4. The rotary engine of claim 1 wherein the side of said one rotor includes opposite tip portions, one of said tip portions having said slot means formed therein.

5. The rotary engine of claim 1 wherein each rotor is hollow and has a cavity therein opening exteriorly of said housing cavity, means for introducing coolant into each rotor cavity during rotation of the rotors.

6. The rotary engine of claim 1 wherein a said seal means overlies the slot means in said one rotor.

7. The rotary engine of claim 6 wherein said slot means includes a plurality of spaced slots formed in the side of said one rotor, each slot extending transversely to the rotational axis of the rotor, spaced portions of said one rotor side separating said slots, said seal means supported by said spaced portions.

8. The rotary engine of claim 1 wherein each seal means extends the length of the sides of said adjacent rotors and includes enlarged spaced end parts and a web part extending between said end parts, the sides of said adjacent rotors being spaced apart, the thickness of said web part being less than the spacing between sides of adjacent rotors, the thickness of said end parts exceeding the spacing between sides of adjacent rotors.

9. The rotary engine of claim 8 wherein each side of said adjacent rotors includes opposite arcuate tip portions, only one of the end parts of the seal means contacting said adjacent rotors when a tip portion of an adjacent rotor is positioned between the seal means end parts.

10. In a rotary engine, said engine including a housing having a cavity therein, at least four rotors of similar substantially elliptical cross sectional shape journaled to rotate about parallel axes within said cavity, power transmitting means coupling said rotors for simultaneous rotation in one direction, said rotors spanning said cavity and each having its side in continuous sealing relationship with the sides of two other of said rotors in all rotative positions of the rotors, the improvement comprising seal means disposed between and in contact with adjacent rotors at the sides thereof, said seal means extending the length of said rotor sides and including enlarged spaced end parts and a web part extending between said end parts, the sides of said adjacent rotors being spaced apart, the thickness of said web part being less than the spacing between sides of adjacent rotors, the thickness of said end parts exceeding the spacing between sides of adjacent rotors so as to prevent said seal means from sliding outwardly from between and out of contact with said adjacent rotors, the side of each rotor including opposite arcuate tip portions, only one of the end parts of the seal means contacting said adjacent rotors when the tip portion of an adjacent rotor is positioned between said seal means end parts.

* * * * *